Dec 29, 1936. S. B. TERRY 2,065,951
COMPARATOR
Filed March 26, 1935
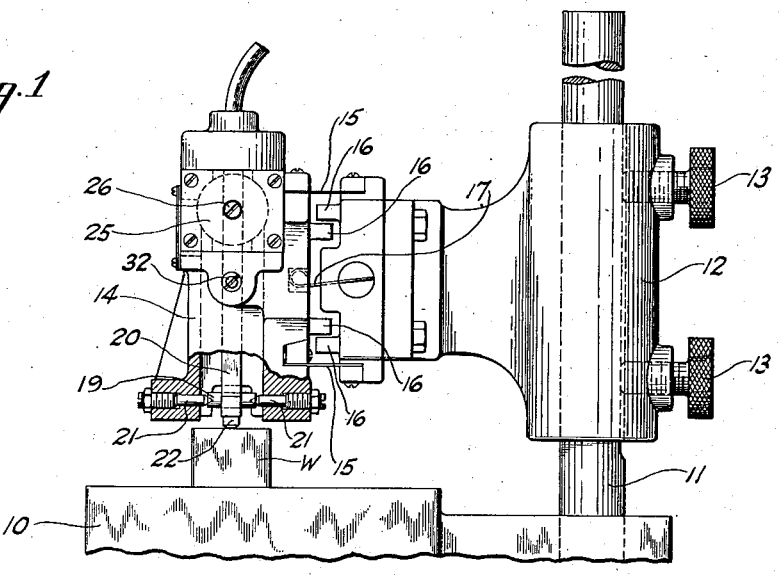
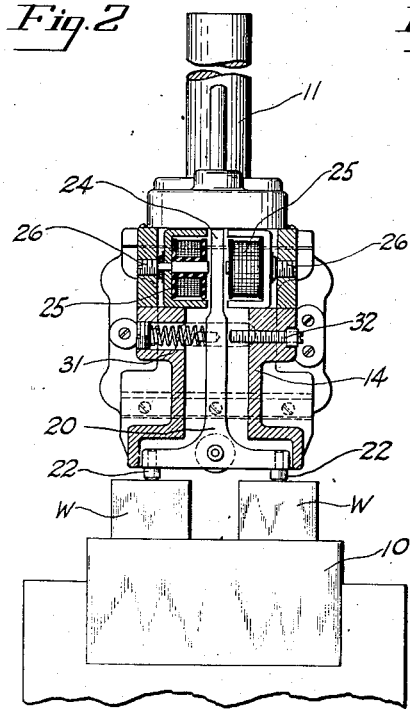
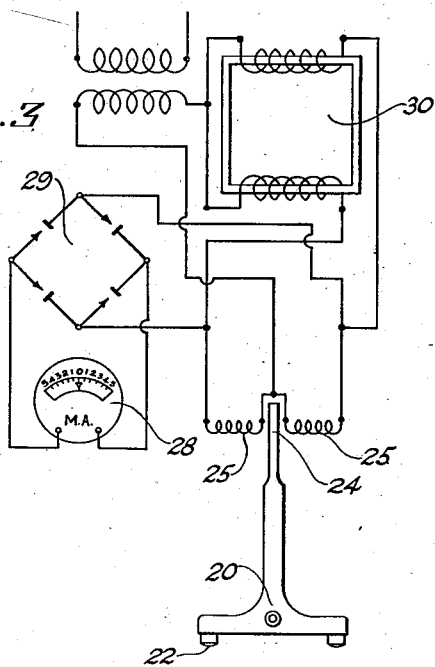
INVENTOR.
Spencer B. Terry
BY
ATTORNEY Patented Dec. 29, 1936

2,065,951

UNITED STATES PATENT OFFICE 2,065,951

COMPARATOR

Spencer B. Terry, West Hartford, Conn., assignor, by mesne assignments, to Niles-Bement-Pond Company, New York, N. Y., a corporation of New Jersey Application March 26, 1935, Serial No. 13,113

2 Claims. (Cl. 33—172)

This invention relates to a dimension gage or comparator and more particularly to a precision gage for comparing the dimensions of size blocks such as the well-known Johansson or Hoke blocks with standards of known precision.

An object of the invention is to provide means for simultaneously determining the relative dimensions of two gage blocks, each block being mounted on the base of the gage and being individually in contact with one of the spaced apart gaging contacts of a pivotally mounted member, the relative size of the blocks being indicated by a suitable electric indicating instrument associated with and indicating the tilted position of the pivotally mounted member.

A feature which enables me to accomplish the above named object is that the pivotally mounted contacting member referred to above is provided in an adjustably mounted gaging head, the pivotally mounted member having two anvils or contacts laterally spaced apart on opposite sides of the pivotal mounting so that the pivotal member will be tilted to different positions by different sizes of blocks mounted on the base and in engagement individually with these contacts.

Another object of the invention is to provide extreme precision means for indicating the different tilted positions of a pivotally mounted contact member when the two contacts thereon are engaged by the gages or articles being compared.

A further object of the invention is to provide means permitting a limited movement of the entire head in which the pivotally mounted contacting member is provided so that slightly different positions of the head may be assumed toward or from the base on which the articles being compared are mounted, these movements not interfering with the precision of the gaging or comparing operations.

With the above and other objects in view my invention includes the features of construction and operation set forth in the following specification and illustrated in the accompanying drawing.

In the accompanying drawing annexed hereto and forming a part of this specification, I have shown my invention embodied in a bench type gage or comparator of extreme precision having an adjustable bracket to accommodate articles of different dimensions, but it will be understood that the invention can be otherwise embodied and that the drawing is not to be construed as defining or limiting the scope of the invention, the claims appended to this specification being relied upon for that purpose.

In the drawing:

Figure 1 is a side elevation of a complete gage, parts of the gaging head being broken away to more clearly show its construction.

Fig. 2 is a front elevation of the complete gage, the head thereof being shown in section to more clearly disclose the pivotally mounted contacting member, and Fig. 3 shows the wiring diagram for an electric indicating instrument which may be used with the gage.

In the above mentioned drawing I have shown but one embodiment of the invention which is now deemed preferable, but it is to be understood that changes and modifications may be made within the scope of the appended claims without departing from the spirit of the invention.

Briefly and in its preferred aspect, my invention may include the following principal parts: First, a base; second, a bracket supported thereon and adjustable directly toward and from the base; third, a gage head member mounted on the bracket for limited movement relative thereto in one direction only; fourth, a pivotally mounted contacting member within the head having two laterally disposed contacts on either side of the pivotal mounting therefor so that two articles or gage blocks to be compared may be simultaneously mounted on the base and individually engage the supported contacts; fifth, an arm preferably integral with the pivotally mounted member and extending normally from the axis of the pivot and normally to a line connecting the contacts; sixth, electro-magnetic coils on opposite sides of the extended portion of the arm so that the end of the arm moves between the coils as the position of the gaging member changes; seventh, electric circuits and an indicating instrument associated with the coils and serving to indicate the position of the arm between the coils and thus indicating the positions of the contacts relative to the base.

Referring more in detail to the figures of the drawing, I provide a base 10 having a carefully finished plane surface on its upper face on which articles being compared may be mounted. Extending from a portion of this base 10 is an upright post 11 upon which a bracket 12 may be vertically adjusted for movement directly toward and from the base. For this purpose the bracket 12 is provided with screws 13 which may be engaged with the post to permit adjustment of and locking of the bracket in any desired position.

Upon the free end of the bracket 12 is mounted a head member 14, this member 14 preferably having limited free movement relative to the bracket in a direction directly toward and from the base 10. For this purpose two parallelly disposed flexible strips of metal 15 connect portions of the head 14 and bracket 12 so that the head member 14 may move directly vertically relative to the bracket 12. By means of the strips 15 the head member 14 may move directly toward and from the base 10, that is, in a direction normal to the surface of the base 10 on which articles W are mounted when being compared but is restrained from moving in any other direction. To limit movements of the head 14 relative to the bracket 12 there are provided overlapping lugs 16 outstanding respectively from the bracket and head. Preferably also a light spring 17 mounted in the bracket may engage a recess in the head to partially support the head relative to the bracket.

Within the head 14 there is provided a pivotally mounted member 20 engaging and being supported by a pair of aligned pivots 21 having conical ends. These pivots 21 engage the recessed opposite ends of a shaft 19 extending through the member 20. The pivotal movement of the member 20 is in a vertical plane about a horizontal axis parallel to the surface of the base 10. On opposite sides of the axis of the pivots 21 and equi-distant therefrom are contacts 22, these preferably being in the form of lugs or studs outstanding from the lower surface of the tilting member 20. The direction of the pivotal axis for this member 20 is such that when blocks W of slightly varying size are placed on the base and under the contacts 22 the member 20 is tilted to slightly different positions.

In order to determine the position assumed by the tilting member 20, which will therefore indicate the relative height of the two articles W being compared, there is provided as an integral part of the member 20 an upwardly extending arm 24 as shown most clearly in Fig. 2. This arm 24 is symmetrical with respect to the shorter arms on which the contacts 22 are mounted. The member 20 or at least the extended end of the arm 24 is formed of steel or other magnetic material. On opposite sides of this extended portion of the arm are electro-magnetic coils 25. These coils 25 are suitably housed within metal cups, the position of which toward or from each other may be slightly adjusted as by means of suitable screws 26. Connected to these coils 25 is an indicating instrument 28 similar in every way to that shown in my copending application Serial No. 3, filed January 2, 1935. Also provided in the electric circuit is a plate rectifier 29 and a suitable transformer 30. As the electric circuits of this gage are similar in every way to those shown and described in my copending application, it is not thought that an extended description will be necessary; it will suffice to state that different positions of the arm 24 between the coils 25 assumed by this arm 24 when blocks W of slightly differing size are in engaging position will be indicated by the varying positions of the pointer of the indicating instrument 28.

Normally a light spring 31 forces the arm 24 in a direction so that the right hand contact 22 as seen in Fig. 2 will be at a less distance from the base than the left hand contact. Also provided is an adjustable stop 32 adapted to limit the extreme position to which the arm 24 may be forced by the spring 31.

Primarily this gage is designed for comparing extremely accurate blocks with masters or standards of known precision. By means of this gage the standard and the specimen being compared therewith may be simultaneously mounted in position. The gage and blocks are then allowed to come to standard temperature whereupon the indicator may be read and the variation in size between the blocks may be at once determined. The blocks may therefore be again compared in a similar manner in directly opposite positions, the blocks being reversed so that they will be under the opposite contact. Another reading of the instrument is then taken. Variations of blocks from masters or standards of known precision may promptly be determined to an extreme precision.

What I claim is:

1. A linear gage comprising in combination, a base having a plane specimen supporting surface thereon, a gaging head adjustable toward and from said plane surface, a contacting member pivotally mounted within said head, said contacting member having laterally spaced contacts on opposite sides of its pivotal mounting whereby articles to be gaged having opposite plane and parallel surfaces may individually contact therewith when mounted in position on said plane surface on said base, an arm on said contacting member disposed symmetrically relative to said contacts, electro-magnetic coils on opposite sides of said arm, and an electric instrument connected to said coils to determine the position of said contacting member and the contacts thereon when in gaging position.

2. A linear gage comprising in combination, a base having a plane specimen supporting surface thereon, a gaging head adjustable toward and from said plane surface, a contacting member pivotally mounted within said head and supported for limited free movement toward and from said plane surface of said base, said contacting member having laterally spaced contacts on opposite sides of its pivotal mounting whereby articles to be gaged having opposite plane and parallel surfaces may individually contact therewith when mounted in position on said plane surface on said base, an arm on said contacting member disposed symmetrically relative to said contacts, electro-magnetic coils on opposite sides of said arm, and an electric instrument connected to said coils to determine the position of said contacting member and the contacts thereon when in gaging position.

SPENCER B. TERRY.